Patented Sept. 28, 1954

2,690,448

UNITED STATES PATENT OFFICE 2,690,448

PROCESS FOR THE MANUFACTURE OF ZINC ETHYLENEBISDITHIOCARBAMATE

Christian B. Luginbuhl, Wilmington, Del., assignor to E. I. du Pont de Nemours and Company, Wilmington, Del., a corporation of Delaware No Drawing. Application October 10, 1952, Serial No. 314,212

5 Claims. (Cl. 260—429)

This invention relates to methods for making zinc ethylenebisdithiocarbamate. More particularly, it relates to methods in which a water soluble salt of ethylenebisdithiocarbamic acid and a zinc salt of a strong mineral acid are reacted in an aqueous reaction medium maintained at pH 1.5 thru 6 thruout the reaction. Still more specifically it relates to processes in which the precipitation of zinc ethylenebisdithiocarbamate takes place in an aqueous medium maintained under substantially constant ionic conditions at a pH within the aforementioned range.

Zinc ethylenebisdithiocarbamate has found considerable commercial usage as a fungicidal agent, especially in application to agricultural crops. The product has heretofore been commonly made by adding a zinc salt such as zinc sulfate to a water soluble salt of an ethylenebisdithiocarbamic acid such as disodium ethylenebisdithiocarbamate in aqueous solution. Products so made, while highly effective as fungicidal agents, have the shortcoming of limited stability. It has been found, for example, that zinc ethylenebisdithiocarbamate products so made decompose quite rapidly under adverse shipping and storage conditions.

I have now found a way for making zinc ethylenebisdithiocarbamate which is several times more stable than the products made heretofore.

The essential reactants employed in practicing the processes of the invention are the same as those used in the prior art, namely, a water soluble salt of ethylenebisdithiocarbamic acid and a zinc salt of a strong mineral acid. More specifically, it is preferred that the water soluble salt of ethylenebisdithiocarbamic acid used be the dithiocarbamate of an inorganic base such as disodium, dipotassium, calcium, barium, or dilithium ethylenebisdithiocarbamate. For economic reasons, the disodium salt is the most preferred. The zinc salt reactant is preferably zinc chloride, zinc sulfate, or zinc nitrate.

The water soluble salt of ethylenebisdithiocarbamic acid and the zinc salt of a strong mineral acid are conveniently reacted according to the processes of the invention by feeding them into an aqueous reaction medium maintained at a pH of about 1.5 to 6, and preferably pH 2.5 to 5 for optimum product stability and yield, thruout the reaction process. The reactants are added to the aqueous reaction medium simultaneously and in substantially stoichiometrically equivalent amounts.

While it is important that the reactants be introduced into the aqueous reaction medium simultaneously or substantially so, as in small intermittent increments, it will be understood that in beginning the process the addition of one or the other of the reactants can be started first followed shortly by subsequent addition of the other reactant so that a major portion of the reactants are added simultaneously.

In order to maintain the low pH conditions under which the processes of the invention are carried out, it is necessary to introduce into the reacting mass a strong mineral acid, for example, hydrochloric acid or sulfuric acid. The acid can be added separately as a third stream or it can conveniently be added in mixture with the zinc salt reactant.

The water in the aqueous reaction medium, whether added before addition of the reactants, along with them, or both, should be present in amount sufficient to maintain the reacting mass in a fluid, easily stirred form thruout the process.

Various manipulative techniques can be used to bring the reactants together to effect reaction within the critical pH conditions required. Thus the process can be conducted batchwise. Such a method is conveniently practiced, for example, by first charging an aqueous solution into a reaction vessel. This initial charge is called a "heel." The material so introduced can be water itself, but more preferably, it is the mother liquor from a previous preparation of zinc ethylenebisdithiocarbamate according to processes of this invention, or it is a solution of an inorganic salt composed of ions which do not form precipitates with zinc or ethylenebisdithiocarbamate ions. Preferably such salt solutions are of a concentration similar to that which would exist in the mother liquor from a previous preparation according to the invention so that the subsequent precipitation reaction is carried out under substantially constant ionic conditions. Starting salt solutions, for example, can be of sodium chloride, sodium sulfate, calcium chloride, potassium chloride, or potassium sulfate solutions.

The amount of "heel" used in carrying out batch-wise processes of the invention can be varied widely depending on the degree of fluidity desired in the reaction mass and the concentration of reactants in the feed streams. In general, the "heel" will be from 10% to 60% by weight of the finished batch.

While agitating the aqueous solution, the reactants, the ethylenebisdithiocarbamate and the zinc salt of a mineral acid, are then introduced simultaneously and in substantially stoichiometric proportions. Preferably, the reactants are added in aqueous solution, and most preferably as 0.5 to 1.7 molar aqueous solutions. Vigorous agitation is desirable to avoid thickening of the reaction mass when the more concentrated reactant solutions are fed.

The pH of the aqueous reacting medium is measured either continuously or at frequent intervals and a strong mineral acid is added to the mass as required to maintain that pH within the limits of about 1.5 to 6, and more preferably pH 2.5 to 5.

Slight variation from the recited pH ranges for short periods during the reaction, such as might be occasioned for example by inexact proportioning for a time of the reagents being added, does not seriously affect the quality of the product obtained and it will be understood, therefore, that such operation is within the spirit of the invention.

Alternatively, the process can be carried out continuously using a conventional pipeline reactor or by feeding the reactants continuously into a reaction zone while withdrawing a portion of the reacting mass continuously.

The processes of the invention are preferably carried out at a temperature not in excess of about 65° C. and still more preferably, in the range of 25 to 40° C. The reactions involved in the processes of the invention appear to proceed almost instantaneously at temperatures within the latter range. Temperaures substantially in excess of 65° C. are not practical because of excessive decomposition at such temperatures. Lower temperatures say down to about 10° C. can also be employed but refrigeration requirements make the use of such lower temperatures more costly in commercial operation.

Zinc ethylenebisdithiocarbamate precipitates in the reacting mass as the reactants are added. For practical reasons of economics and ease of handling, the addition of reactants is terminated when sufficient has been added to give a reaction mass which contains from 5 to 15% by weight of crystalline zinc ethylenebisdithiocarbamate supended in the aqueous medium.

The crystalline zinc ethylenebisdithiocarbamate can be separated and recovered from the reaction mass by conventional methods as by means of a filter or centrifuge. The stability characteristics of the product can be further improved by holding it in the reaction mass under the pH and temperature conditions of the precipitation reaction for about one-half to two hours before separating the solid product.

The solid product is washed well with water according to conventional methods to remove substantially all of the mother liquor and soluble salts present. It can then be dried, care being taken not to use temperatures above those which effect decomposition of the product. Preferably, the drying temperature does not exceed 100° C.

The dried product preferably contains not more than about 2% water. If it is desired to make a powdered zinc ethylenebisdithiocarbamate fungicide containing solid conditioning materials, such materials can be added to the reaction mass prior to or after the filtration and drying operation. For example, conventional inert solid diluents such as fuller's earth, talc, and pyrophyllite, can be added in this manner.

In order that the invention may be better understood, the following detailed examples are given in addition to the examples already given above.

*Example 1*

Two liters of a one molar solution of sodium chloride in water were charged into a 5 liter glass reaction flask fitted with pH electrodes, a high speed agitator, two addition burettes, a feed line for nitrogen, and an exit line to a gas absorption train.

While agitating the liquid in the reaction flask, one liter of a solution consisting of 1 mole of C. P. grade zinc chloride and 0.05 mole of C. P. grade hydrogen chloride in water, and 1 liter of a solution consisting of 1 mole of recrystallized disodium ethylenebisdithiocarbamate hexahydrate in water were added gradually in separate streams into the flask.

The flow of the acidified zinc chloride solution was started first. When about 0.02 mole of the 1 mole of zinc chloride solution had been added, the addition of the 1 mole of solution of sodium ethylenebisdithiocarbamate was started and continued simultaneously with that of the zinc chloride solution so that the reactants were being added in substantially stoichiometrically equivalent amounts. The rate of addition of the acidified zinc chloride solution was modified slightly however from time to time as required to maintain the pH of the reacting mass at 3.1±0.3.

Addition of the reactant solutions was completed in 1.4 hours. The temperature of the reacting mass was maintained at 26.5–28.5° C. thruout this period. Nitrogen was fed into the reactor during the reaction to maintain a slight nitrogen pressure. Analysis of the effluent gas showed that it contained substantially no hydrogen sulfide or carbon disulfide.

Upon completion of addition of the reactants, the white zinc ethylenebisdithiocarbamate precipitate which had formed was allowed to remain in the reaction mass for an additional 30 minutes under the same pH, temperature, and agitation conditions maintained during the reaction. The precipitate was then filtered and washed with water until the filtrate contained less than 0.1% salt. The wet cake was dried under vacuum at 25° C. to a water content of 0.85% as determined by toluene distillation and titration with Karl Fischer Reagent.

The dried product analyzed over 99% zinc ethylenebisdithiocarbamate by the carbon disulfide evolution method. The carbon disulfide evolution method is described in Anal. Chem. 23, 1842 (1951) "Determination of Dithiocarbamates" by D. G. Clarke, H. Baum, E. L. Stanley, and W. F. Hester. Applying this technique, an 0.5 g. sample of the product is digested at 100° C. in the absence of air in a liquid mixture of 50 cc. of 9 N sulfuric acid and 50 cc. of 50% by volume aqueous ethanol. Any hydrogen sulfide formed during the digestion of the sample is absorbed in aqueous cadmium chloride prior to the absorption of carbon disulfide which is liberated. The liberated carbon disulfide is absorbed in methanolic potassium hydroxide and the resulting xanthate is titrated with standard iodine solution. Under the digestion conditions of this technique, the dithiocarbamate group breaks down quantitatively with liberation of carbon disulfide. The amount of hydrogen sulfide formed is taken as an index of impurities since with pure zinc ethylenebisdithiocarbamate no hydrogen sulfide is formed.

The resistance of the product of this example to decomposition was measured by subjecting it to accelerated "aging" conditions. It was held in air at 45° C. and 80% relative humidity. After 506 hours at these severe conditions, the loss of zinc ethylenebisdithiocarbamate was only 6.3%.

*Example 2*

Zinc ethylenebisdithiocarbamate was precipitated by simultaneous addition over a one-hour period of (1) 1000 cc. of a 1 molar aqueous solution of C. P. zinc sulfate and (2) 1000 cc. of a 1 molar aqueous solution of recrystallized disodium ethylenebisdithiocarbamate hexahydrate to (3) an efficiently stirred heel of 2000 cc. 1 molar aqueous solution of C. P. sodium sulfate, constantly maintaining the aqueous zinc sulfate feed stream about 2.0–3.0% ahead of the aqueous disodium ethylenebisdithiocarbamate stream. The pH during the precipitation was controlled between 2.5 and 3.5 by the addition of a 10% aqueous sulfuric acid solution as required. The temperature during precipitation was maintained at 34.5 to 35.5° C.

After aging the reaction mixture for one hour under the same conditions, the white zinc ethylenebisdithiocarbamate slurry was separated by centrifugation, washed until the filtrate was substantially free of sodium sulfate, and dried for 48 hours at 40° C. in a nitrogen gas stream of a vacuum of 10–30 mm. mercury.

The zinc ethylenebisdithiocarbamate prepared in this manner analyzed to be 99.5% pure by the carbon disulfide evolution method, and contained less than 0.2% water and less than 0.2% water soluble salts. It decomposes only 6–8% in a storage period of 500 hours at 45° C. and 80% relative humidity in air.

*Example 3*

Two liters of a one molar solution of sodium chloride in water were charged into a 5 liter glass flask equipped as in Example 1. While agitating this "heel" vigorously there were added simultaneously over a 1 hour period 1 liter of a solution containing 1 mole of commercial grade zinc chloride and 0.2 mole of hydrogen chloride, and 1 liter of a 1 molar aqueous solution of technical grade disodium ethylenebisdithiocarbamate. The flow of the zinc chloride solution was started prior to the flow of the dithiocarbamate solution, then was permitted to lead the dithiocarbamate solution as in Example 1 so that a slight excess, not more than about 2%, of the zinc chloride reactant is present in the reacting mass until all of that reactant has been added.

The reaction mass was maintained thruout at a pH of 1.9±0.2 and a temperature of 35.0 to 35.2° C.

The zinc ethylenebisdithiocarbamate precipitate was aged five minutes in the reaction mass under the pH, temperature and agitation conditions of the reaction and then filtered and washed with water until the washings contained less than 0.5% salt. The wet cake was dried under vacuum at 35° C. after sweeping nitrogen thru the drying vessel. The water content of the product was 0.86%.

The product analyzed 98% zinc ethylenebisdithiocarbamate as determined by the carbon disulfide evolution method. The yield was practically theoretical.

After accelerated aging in air at 80% relative humidity and 45° C. for 526 hours the loss of zinc ethylenebisdithiocarbamate content of the product was only 19%.

In comparison, zinc ethylenebisdithiocarbamate products made from like grade reactants by the usual procedure of adding the aqueous solution of zinc chloride or zinc sulfate to an aqueous solution of disodium ethylenebisdithiocarbamate at 30 to 40° C. with good agitation have been found to lose from 40 to 65% of their zinc ethylenebisdithiocarbamate content on storage for 500 hours at 45° C. and at 80% relative humidity.

*Example 4*

Zinc ethylenebisdithiocarbamate was precipitated by simultaneous addition over a one-hour period of (1) 1000 cc. of a 1 molar aqueous solution of technical disodium ethylenebisdithiocarbamate and (2) 1000 cc. of a 1 molar aqueous solution of zinc chloride to (3) an efficiently stirred heel of 2000 cc. 1 molar aqueous solution of C. P. sodium chloride, constantly maintaining the aqueous zinc chloride feed stream about 2.0 to 3.0% ahead of the disodium ethylenebisdithiocarbamate stream. The pH during the precipitation was controlled at 5.0±0.5 by addition of 5% aqueous hydrochloric acid solution as required. The temperature during the precipitation was maintained at 34.5 to 35.5° C. The zinc chloride solution used in this preparation was obtained by dilution of a technical 62.70% zinc chloride containing 1.26% ammonium chloride.

After aging the reaction mixture for one hour under the same conditions, the precipitated white zinc ethylenebisdithiocarbamate was separated by centrifugation, washed until the filtrate was substantially free of sodium chloride, and dried for 48 hours at 40° C. in a nitrogen gas stream at a vacuum of 10–30 mm. mercury.

The zinc ethylenebisdithiocarbamate prepared in this manner analyzed 99.2% pure by the carbon disulfide evolution method and contained less than 0.2% water and 0.3% water soluble salts. It decomposed approximately 19–21% during a storage period of 500 hours at 45° C. and 80% relative humidity in air. Calculated on the disodium ethylenebisdithiocarbamate charged, a 97% yield of zinc ethylenebisdithiocarbamate was obtained.

*Example 5*

Into a 2 liter creased flask was charged 1260 ml. of water, and the temperature was adjusted to 35° C. While maintaining the temperature at 35° C. by means of a water bath, 270 ml. each of one molar zinc chloride solution and one molar disodium ethylenebisdithiocarbamate solution were added separately with good mixing, at a steady rate, in the course of 53 minutes. During the addition of the zinc chloride and the disodium ethylenebisdithiocarbamate solutions, the pH of the reaction mixture was maintained in the range 2.4–3.4 by the separate addition of 1.035 normal hydrochloric acid. A total of 9.0 ml. of acid was required in addition to the 3.4 ml. of acid present in the 1 molar zinc chloride solution (the latter 3.4 ml. to prevent hydrolysis and precipitation of basic zinc chloride in the 1 molar zinc chloride solution).

Approximately 10 minutes after the precipitation was completed, about half of the slurry was withdrawn, filtered, washed well with water, and dried in a vacuum oven at 40° C. (Product A).

The remaining slurry was held at 35° C. and a pH of 3.0–3.5 for 180 minutes requiring an additional 1.2 ml. of 1.035 normal hydrochloric acid. It was filtered, washed well with water, and dried in a vacuum oven at 40° C. (Product B). Both samples were analyzed by the carbon disulfide evolution method and found to contain over 99% zinc ethylenebisdithiocarbamate.

Decomposition of Product A was equivalent to a loss of 10.2% of the zinc ethylenebisdithiocarbamate in 500 hours when stored at 450° C., 80% relative humidity in air. The loss of zinc ethylenebisdithiocarbamate under the same conditions in Product B was 4.4%.

I claim:

1. A process for the manufacture of zinc ethylenebisdithiocarbamate comprising reacting a water soluble salt of ethylene bisdithiocarbamic acid with a zinc salt of a strong mineral acid in an aqueous medium maintained at pH 1.5 to 6.0 substantially thruout the reaction.

2. A process for the manufacture of zinc ethylene bisdithiocarbamic by the reaction of a water soluble salt of ethylene bisdithiocarbamic acid with a zinc salt of a strong mineral acid comprising feeding said salts simultaneously and in substantially stoichiometrically equivalent amounts into an aqueous reaction medium with agitation while maintaining the aqueous reaction medium at pH 1.5 to 6 substantially thruout the period of addition of said salts by adding a strong mineral acid to the reaction medium as required.

3. A process for the manufacture of zinc ethylenebisdithiocarbamate by the reaction of disodium ethylenebisdithiocarbamate with a zinc salt of a strong mineral acid comprising feeding aqueous solutions of said salts simultaneously and in substantially stoichiometrically equivalent amounts into an aqueous reaction medium with agitation while maintaining the aqueous reaction medium at a temperature less than about 65° C. and at a pH of about 1.5 to 6 substantially thruout the period of addition of said salts by adding a strong mineral acid to the reaction medium as required.

4. A process for the manufacture of zinc ethylenebisdithiocarbamate by the reaction of disodium ethylenebisdithiocarbamate with a zinc salt of a strong mineral acid comprising feeding aqueous solutions of said salts simultaneously and in substantially stoichiometrically equivalent amounts into an agitated aqueous reaction medium maintained at a temperature less than about 65° C., said aqueous reaction medium containing in solution anions and cations substantially in the molar concentration obtained by mixing said aqueous solutions of said salts in the absence of additional water, and adding a strong mineral acid to the aqueous reaction medium as required to keep the pH of the medium substantially constant within the range of pH 1.5 to 6 substantially thruout the period of addition of said salts, whereby precipitation of zinc ethylenebisdithiocarbamate occurs in an aqueous medium maintained under substantially constant ionic conditions.

5. A process for the manufacture of zinc ethylenebisdithiocarbamate by the reaction of disodium ethylenebisdithiocarbamate with a zinc salt of a strong mineral acid comprising feeding 0.5 to 1.7 molar aqueous solutions of said salts simultaneously and in substantially stoichiometrically equivalent amounts into an agitated aqueous reaction medium maintained at a temperature of 25 to 40° C., said aqueous reaction medium consisting initially of an aqueous solution containing anions and cations substantially in the molar concentration obtained by mixing said aqueous solutions of said salts in the absence of additional water, and adding a strong mineral acid to the aqueous reaction medium as required to keep the pH of the medium substantially constant within the range of pH 2.5 to 5 substantially thruout the period of addition of said salt, whereby precipitation of zinc ethylenebisdithiocarbamate occurs in an aqueous medium maintained under substantially constant ionic conditions.

References Cited in the file of this patent

UNITED STATES PATENTS

| Number | Name | Date |
| --- | --- | --- |
| 2,406,960 | Neal | Sept. 3, 1946 |
| 2,504,404 | Flenner | Apr. 18, 1950 |
| 2,545,948 | Flenner | Mar. 21, 1951 |